United States Patent

Mainthia

[15] 3,660,097

[45] May 2, 1972

[54] DIAZO-POLYURETHANE LIGHT-SENSITIVE COMPOSITIONS

[72] Inventor: Shashi B. Mainthia, New Rochelle, N.Y.

[73] Assignee: Polychrome Corporation, on the Hudson, Yonkers, N.Y.

[22] Filed: Nov. 28, 1969

[21] Appl. No.: 880,918

[52] U.S. Cl. ....................96/91, 96/75, 96/33
[51] Int. Cl. ....................G03c 1/52, G03c 1/64
[58] Field of Search....................96/91, 33, 75, 49, 36

[56] References Cited

UNITED STATES PATENTS

| | | | |
|---|---|---|---|
| 3,208,850 | 9/1965 | Daech | 96/91 |
| 3,211,553 | 10/1965 | Ito | 96/33 |
| 3,136,637 | 6/1964 | Larson | 96/75 |
| 2,826,501 | 3/1958 | Hodgins | 96/91 |

*Primary Examiner*—Norman G. Torchin
*Assistant Examiner*—Edward C. Kimlin
*Attorney*—Curtis, Morris & Safford

[57] ABSTRACT

Compositions comprising solvent-soluble, negative-acting and positive-acting light-sensitive diazonium compounds and synthetic, film-forming, solvent-soluble essentially linear polyurethane resins, which compositions can be coated onto suitable base sheet materials to form presensitized lithographic printing plates, proofs for multi-color printing, visual aids, printed circuits and the like.

34 Claims, No Drawings

DIAZO-POLYURETHANE LIGHT-SENSITIVE COMPOSITIONS

This invention relates to light-sensitive resinous compositions that are especially suitable for many purposes, including making lithographic plates, multi-color proofs, visual aids and printed circuits, and more particularly to compositions containing a light-sensitive, negative-acting or positive-acting diazonium compound and an oleophilic, solvent-soluble, essentially linear polyurethane resin that can be coated onto suitable base materials, such as lithographically or electroconductively suitable metals, plastics such as Mylar and the like, exposed to light through a negative or positive image transparency and developed with a totally or substantially totally aqueous developer.

Among the numerous improvements and advantages provided by this invention are, briefly, the integration of a light-sensitive material and a long-lasting image- or object-forming material that can be applied as a single coating onto an appropriate base, which coating (1) can be developed on the base with relatively inexpensive, non-volatile, non-toxic, wholly or substantially wholly aqueous desensitizing or developing solutions, (2) has on the base substantially at least the shelf life, storability, light-sensitivity and durability of, e.g., currently commercial presensitized lithographic plates, and generally substantially longer presslife, (3) requires no hand lacquering after development, and (4) can be satisfactorily developed to form high quality, sharp fine objective areas or images quickly and easily by relatively unskilled workers without undue care to avoid impairment.

The art of lithographic printing, to which this invention is eminently suited, is based upon the immiscibility of grease and water, and takes advantage of that phenomenon by utilizing the preferential retention on an image area of a transferable, greasy, image-forming substance and the similar retention on a corresponding non-image area of an aqueous dampening fluid. If a greasy image is formed upon a suitable surface and the entire surface then is moistened with an aqueous solution, the image area will repel the water whereas the non-image area will retain the water. Upon subsequent application to the entire surface of a greasy ink, the image portion of the surface retains the ink whereas the moistened non-image portion repels it. The ink on the image area then can be transferred to the surface of a suitable material on which the image is to be reproduced, such as paper, cloth and the like. Transferring the ink usually includes the use of an intermediary surface, such as a so-called offset or blanket cylinder, to avoid reversal of the image, or mirror-image printing.

Lithographic plates, such as those to which the present invention is adapted, have a coating of a light-sensitive composition that is adherent to a suitable base sheet material, for example, an aluminum sheet. If the light-sensitive coating is applied to the base sheet by the manufacturer, the plate is referred to as a "presensitized plate." If the light-sensitive coating is applied to the base by a lithographer or a trade plate-maker, the plate is referred to as a "wipe-on" plate. Depending upon the nature of the photosensitive composition employed, a coated plate can be utilized to reproduce directly the image to which it is exposed, in which case the plate is termed positive-acting, or to reproduce an image complementary to the one to which it is exposed, in which case the plate is termed negative-acting. In either event the image area of the developed plate is relatively oleophilic and the non-image area is relatively hydrophilic.

A negative lithographic plate is exposed to light through a negative transparency of the desired image. The light causes the exposed light-sensitive material, commonly a diazo compound, to harden the coating on the plate, making the exposed area insoluble to a desensitizing solution thereafter applied onto the plate for the purpose of removing the portion of the light-sensitive coating which, because it was protected from the light by the negative, was not hardened. The light-hardened surface of a negative plate is the oleophilic surface compatible with the greasy printing ink and is called the "image area"; the surface from which the non-hardened light-sensitive coating is removed by the desensitizer is, or can be converted to, a hydrophilic surface having little affinity for the greasy ink and is called the "non-image" area.

In usage, a positive plate differs in that the hydrophilic non-image area is formed in the portion of the light-sensitive coating exposed to light through a positive image transparency whereas the unexposed portion is either oleophilic or convertible to an oleophilic state to form the ink-receptive image area.

Several attempts have been made by others to prepare lithographic plates having coated thereon a resinous material capable of being formed into a desired image to serve as the ink-receptive printing surface. Such plates, however, have been either or both totally different from the ones of this invention and commercially unacceptable. For example:

U.S. Pat. No. 3,136,637 discloses a lithographic plate having an aluminum base sheet, a first coating of a light-sensitive diazo compound on the base and a second, distinct coating of a resinous material thereover. The top resin layer of the multiply-coated plate is solvent soluble and is suitable as a printing surface once non-image areas are removed. Such areas are removed by removing unexposed areas of the underlying first coating of diazo, literally undermining the overcoated resinous layer. An inherent problem of such plates is that they can be inadvertently over-developed, e.g., removal of image area by undermining, due to the distinctness of the separate coatings.

U.S. Pat. No. 3,211,553 discloses a lithographic plate having a positive-acting light-sensitive coating composed of a positive-acting complex phosphotungstate diazonium compound and specific resinous materials. There is no suggestion in the patent that a corresponding negative-acting plate can be made inasmuch as the patentee begins with a negative-acting lithographic diazo that must be converted chemically with a phosphotungstic acid, or that linear polyurethane is suitable. The plates are developed, i.e., exposed areas are removed, with an essentially organic solvent medium.

Kosar, in his book *Light Sensitive* Systems (Wiley, 1962), suggests incorporating negative-acting diazos along with organic colloids such as gelatin and dextrin, or synthetic resins such as polyvinyl alcohol and methyl cellulose, to form lithographic coatings. Because of their hydrophilic character, however, such resinous materials do not form ink-receptive image-printing surface areas, and therefore are unsuitable for making lithographic plates according to this invention.

U.S. Pat. No. 2,826,501 describes a lithographic plate coating composition containing a light-sensitive condensation product of p-diazo-diphenylamine with formaldehyde and about 9 times as much of a water-soluble superpolyamide nylon resin. The condensation product and the nylon resin are coated from an aqueous solution, and their specific proportions are said to be both critical and within a narrow range. Moreover, an exposed plate prepared according to that patent must be developed with an organic developing solution, a totally aqueous or substantially aqueous developer being unsuitable. As pointed out in U.S. Pat. No. 3,136,637, the selection of resinous materials is limited, processing difficulties occur in making the compositions, especially in the selection and use of proper commercial solvents, the presslife of such plates is not significantly improved over other plates, and the image areas of the developed plates should be further treated or coated prior to use.

It is an object of this invention to provide a light-sensitive polyurethane composition suitable for forming an image or an object area on a suitable base. Another object of this invention is to provide such a composition for coating onto a lithographic printing plate to form an improved presensitized plate. It is also an object of this invention to provide a lithographic printing plate that has a highly abrasion-resistant and wear-resistant oleophilic polyurethane image-forming surface and thus provides long presslife. A further object of this invention is to provide a presensitized negative-acting or positive-acting lithographic printing plate that has a light-sensitive diazonium-polyurethane coating adapted to form, upon exposure to light, an ink-receptive image printing area, which plate is stable to ordinary ambient heat and humidity conditions during storage for protracted periods of time. Another object of this invention is to provide a lithographic printing plate having a light-sensitive diazonium-polyurethane coating capable of forming an oleophilic image area that is long-running and has excellent abrasion-resistance, which plate, after exposure to light through an image transparency, can be developed with a totally aqueous or substantially totally aqueous developer medium that removes the light-sensitive coating from non-image areas, and which plate requires no hand lacquering or other treatment of the image surface. Still another object of this invention is to provide a light-sensitive diazonium-polyurethane composition for coating onto suitable base sheets that can then be used, by exposure to light, development and further treatment as might be necessary, to make a variety of useful articles, for example, visual aids, proofs in advance of multi-color printing and printed circuits. These and other objects of this invention will be in part discussed in and in part apparent from the following more detailed disclosure.

Broadly, the instant invention involves compositions containing a solvent-soluble, negative-acting or positive-acting, light-sensitive diazonium component that can be one of the commonly used lithographic diazo compounds, or reaction or condensation products of such diazo compounds with agents therefor that do not materially impair the light-sensitivity of the diazo, and a polyurethane resin compound that is essentially linear, water-insoluble, thermoplastic and oleophilic in character. Such compositions can be coated onto suitable bases, such as metals and plastics, from an essentially organic solvent medium to form, for example, storage-stable presensitized lithographic plates or printed circuit boards. After light exposure of the coated bases, non-image areas of the coated composition can be removed from the base with a completely or substantially completely aqueous developer that acts upon the bond between the underlying base material and (for negative-acting) the light-sensitive diazonium component in the coating, or (for positive-acting the light-reacted diazonium component in the coating, to loosen that bond, and thereby remove the coating composition. Plates and other articles according to this invention, both in the presensitized state and after exposure and development, are characterized by unusually good to exceptional stability during storage and subsequent handling and usage to such known common deteriorating factors, during storage, as moisture, heat and "dark reaction," and during use, as abrasion, decrease of oleophilicity, wear and weakening of mechanical strength. In particular, the exceptional abrasion-resistance of polyurethane provides plates according to this invention having unusually long press life, for example, in the order of up to about 5 to 10 times the presslife of other synthetic resins. Fine, sharp, clear images or objects can be formed on the coated bases to make high quality, accurate printed circuits, color proofs, visual aids and, in the case of lithographic plates, great numbers of excellent quality reproductions.

Virtually any material known and commonly used as a lithographic base surface for printing plates presently appears possible to use as a base on which to coat and use the light-sensitive compositions of this invention. Such lithographic base surfaces include those made from paper, from synthetic resins and, especially in the case of long-running, dimensionally stable plates, from metals. Of the commonly used metals such as steel, zinc, aluminum, copper and chromium, sheets made of aluminum are preferred for a variety of reasons known in the art. Before applying the composition of the invention to the base, which desirably is in sheet form, the base can be treated in ways known to the art to enhance its character as a lithographic surface. For example, a metal plate can be grained either mechanically or chemically, e.g., as disclosed in U.S. Pat. Nos. 2,882,153 and 2,882,154, to enable better bonding of the coating applied onto it. An aluminum sheet can be anodized electrolytically to form a harder, more wear-resistant and abrasion-resistant surface, e.g., as disclosed in copending applications Ser. No. 430,753, now U.S. Pat. No. 3,440,050 filed Feb. 5, 1965 and Ser. No. 670,403 filed Sept. 25, 1967, now abandoned but disclosed in continuation-in-part application Ser. No. 60,625 filed Aug. 3, 1970. It is also possible to place an intermediate coating on the base surface to provide a firmer bond between the surface and the overcoated diazonium-polyurethane composition. Intermediate bonding layers generally are formed on the plate by application of water-soluble silicates or, preferably, solutions of salts or acids of Group IV–B metal fluorides, for example, potassium zironcium hexafluoride and the acid thereof as disclosed in U.S. Pat. Nos. 2,946,683 and 3,160,506. These and other methods of treating lithographic base sheets are known in the art and can be utilized, as might be desired or advantageous, along with the compositions of this invention.

In general the diazonium components of the instant light-sensitive polyurethane coating compositions are the negative-acting and positive-acting light-sensitive diazos known and commonly used in the lithographic art.

Negative-acting diazo compounds, broadly, are diazo-aromatics, and more particularly are diazo-arylamines that can be substituted on the aromatic nucleus or on the amino-nitrogen, preferably p-diazo-diphenylamine and derivatives thereof, for example, condensation products thereof with organic condensing agents containing reactive carbonyl groups such as aldehydes and acetals, particularly condensates with compounds such as formaldehyde zinc chloride and paraformaldehyde. The preparation of such eminently suitable condensation products is disclosed in U.S. Pat. Nos. 2,922,715 and 2,946,683.

The foregoing diazo compounds are reacted with suitable coupling agents to prepare reaction products that are at least partially soluble in organic solvents, preferably well soluble, and that have light-sensitivity not substantially less than the starting diazo. The reaction products are only slightly water-soluble, if at all. Suitable coupling agents broadly are essentially organic compounds that react with the water-soluble diazo compounds to reduce its ionic character and make it more covalent, do not reduce significantly its light-sensitivity, and produce a reaction product that is soluble in organic solvents but no more than only slightly water-soluble. Such coupling agents in general presently appear to be acidic aromatic compounds, for example, the phosphinic, phosphonic, sulfonic and carboxylic acids of benzene, toluene and naphthalene and their derivatives, for example, the alkali metal salts thereof; hydroxyl-containing aromatic compounds, e.g., phenolics such as diphenolic acid, benzophenone, substituted benzophenones, naphthols, naphthalene diols and alizarins, including sulfonic acids and alkali metal sulfonic acid salts thereof; and acidic aliphatic compounds such as stearic acid and ethylenediamine tetra-acetic acid. Particularly suitable coupling compounds of the type described include toluene sulfonic acid, benzene phosphinic acid, 2,5-dimethyl-benzene sulfonic acid, benzene sulfonic acid sodium salt, nitrobenzene acetic acid, diphenolic acid, 2,3-naphthalene diol, naphthalene-2-sulfonic acid, 1-naphthol-2-(or -4-)-sulfonic acid, 2,4-dinitro-1-naphthol-7-sulfonic acid, 2,4-dihydroxy-benzophenone, 2,2'-dihydroxy-4,4'-dimethoxy-benzophenone, 2,2', 4,4'-tetra-hydroxy-benzophenone, 2-hydroxy-4-methoxy-benzophenone-5-sulfonic acid, m-(p'-anilino-phenylazo)-benzene sulfonic acid sodium salt, p-morpholino-benzene diazonium fluoborate, alizarin sodium monosulfonate and o-toluidine-m-sulfonic acid. Some of those coupling agents and the preparation of coupled products thereof with light-sensitive diazo compounds are disclosed in U.S. Pat. No. 3,300,309 and pending application Ser. No. 660,220 filed Aug. 14, 1967 now U.S. Pat. No. 3,591,575.

The diazo component and the coupling agent preferably are reacted together in approximately equimolecular quantities.

Positive-acting diazo resins known to the art that can be used in taking advantage of this invention include several principal types of light-sensitive 15, 5, compositions. One type are esters of a 1,2-diazo-quinone-sulfonic acid chloride or a 1,2-diazo-naphthoquinone-sulfonic acid chloride with a polyhydroxy phenyl, the latter being a condensation product preferably of pyrogallol and acetone. Such esters are disclosed in U.S. application Ser. No. 601,847 filed Dec. 15, 1966 now abandoned, but disclosed in continuation application Ser. No. 833,878 filed June 5, 1969. Another type of suitable diazo resins are esters of sulfonic acids of ortho-diazo-phenyls, particularly quinone-(1,2)-diazides and naphthoquinone-(1,2)-diazides with phenolformaldehyde resins. Such esters are disclosed in a number of patents, e.g., U.S. Pat. Nos. 3,046,120 and No. 3,188,210. Another type of suitable diazo resins are phosphotungstate diazonium salts, for example, a reaction product of phosphotungstic acid with an acid salt of hexafluorophosphoric acid and the condensation product of para-diazodiphenyl-amine with formaldehyde. Such diazo resins are disclosed in U.S. Pat. No. 3,211,553.

The polyurethane resins with which the solvent-soluble, light-sensitive diazonium compounds described previously can be incorporated to form the coating compositions for making plates and articles according to this invention are the comparatively new, substantially linear, solvent-soluble, essentially thermoplastic polyurethanes as opposed to the thermosetting, generally highly cross-linked polyurethanes. Such resins eminently meet the particular requirements of the lithographic plate-making art in that they are oleophilic in character to provide adequate ink receptivity and good differential with hydrophilic non-image or non-object areas, are film-formers that are soluble in common organic solvents, substantially or completely insoluble in water, and are compatible both physically and chemically with the light-sensitive diazonium components. Moreover, the resins form good continuous films, have exceptional abrasion resistance, are sufficiently hard for long wear during pressruns, and have a requisite degree of resiliency and flexibility without undue brittleness, again for extended presslife. Chemical and physical stability, such as to the conditions of printing on offset presses and to the chemicals and inks used in connection therewith, also are important properties possessed by the linear polyurethanes.

Typical of such polyurethanes that are available commercially are various Estane polyurethanes sold by B.F. Goodrich Co. Estanes are solid thermoplastic film-forming materials possessing many of the properties of cured polyurethanes, particularly the abrasion resistance, while also being soluble in many solvents. The preparation of these materials is disclosed in U.S. Pat. Nos. 2,770,612, 2,871,218 and 2,899,411 and other B.F. Goodrich patents.

An important advantage of the substantially linear, essentially thermoplastic polyurethanes is that they readily and easily can be solvent-coated onto suitable bases and need not thereafter be cured. That is, they can be cured during manufacture to the extent necessary to provide the above-mentioned desirable properties, and then incorporated with the diazonium component in solvent solution and coated onto bases. Essentially thermosetting polyurethanes, on the other hand, either are virtually impossible practically to dissolve, coat and develop if sufficiently cured, due to extensive cross-linking, or impair the light-sensitivity and efficacy of the diazonium component if cured after coating due to the heat and the cross-linking reactions involved during curing. Uncured thermo-setting polyurethanes, the so-called prepolymers, when coated do not have the requisite chemical or physical properties to form storage-stable compositions or coatings on bases.

It is possible, and might be desirable in some instances although generally not, to further cure coatings of the instant compositions during or after the development of the image on a plate. For example, with suitable curing agents in the diazonium-polyurethane compositions, the polyurethane can be further cured in the image areas during light exposure through a negative transparency, or can be further cured by heat in the image areas after exposure and development. Such curing generally will enhance properties such as abrasion resistance, bonding to the substrate and cohesive character of the coating. Curing agents for this purpose are used in small amounts, i.e., in amounts less than about 5 percent by weight of the polyurethane and generally less than about 1 percent, and include isocyanates, peroxides, and epoxy-amine combinations, for example dicumyl peroxide, blocked polyisocyanates, Epon 828 (epoxy resin by Shell Chemical Co.) and dicyandiamine, benzoyl peroxide, and azo-bis-(isobutyronitrile).

A solvent is used to blend the polyurethane resin and the light-sensitive diazonium component, and to coat them as an integral composition onto an appropriate base sheet to form an article of the invention, e.g., a presensitized lithographic plate. A suitable solvent desirably should dissolve both the polyurethane and the diazo at least to an extent that a commercially practical coating solution is formed, a solution in which the resin and diazo are compatibly retained in the proportions desired for the coating subsequently to be formed on a base sheet from the solution. Organic solvents are needed to dissolve the polyurethane. As pointed out previously, the light-sensitive diazonium also is soluble in organic solvent, the extent of solubility often depending upon the specific solvent. Many common organic solvents sufficiently dissolve both the resin and the diazo; certain solvents are especially advantageous for making coating solutions of specific combinations of the polyurethane and a diazonium component.

Practical organic solvents, used alone or in combination with others, and which are thus presently preferred according to this invention, include methylene chloride, dimethyl formamide, dimethyl sulfoxide, butyl Carbitol, methyl Cellosolve, methyl Cellosolve acetate, ketones such as acetone, methyl ethyl ketone and cyclohexanone, ethers such as trioxane and dioxane, and heterocyclics such as tetrahydrofuran, pyridine and isophorone. Methyl Cellosolve and methyl ethyl ketone are particularly suitable solvents to use.

Varying relative amounts of polyurethane and diazonium can be incorporated into the coating composition. In general, even if the resin content of the coated image area is too small, a satisfactory printing plate can be made, but the full advantages of this invention cannot be obtained. The desirable abrasion resistance and wear resistance provided by the polyurethane component in the coating for exceptionally long presslife will not be sufficient relative to a plate on which the image contains no resin. On the other hand if the resin content is too large, the light-sensitivity of the coating composition might be insufficient for an efficient and practical plate. Also, because the developer must penetrate the polyurethane-diazonium coating to loosen the bond between the coating and the base to remove the non-image area, a high proportion of resin reduces the ease and time of developing. Another factor disfavoring too large a proportion of resin, which superficially might seem desirable, is that there would not be sufficient diazonium to be affected by the developer for ready removal of the non-image area.

With the foregoing desiderata in mind, it presently appears possible to make useful articles with polyurethane-diazonium compositions of the invention containing from about 10 percent to about 95 percent by weight of the polyurethane component. A more practical and desirable range is between about 20 percent and about 60 percent of the resin, preferably about 20 percent to about 50 percent with a negative-acting diazonium, and about 33 percent to about 60 percent with a positive-acting diazonium.

The instant compositions can also be blended with other resins and adhesives to improve the bonding of the composition coated onto the substrate. Suitable materials for that purpose include polyethylene oxides such as Polyox resins sold by Union Carbide Corp., aromatic oxide resins such as Phenoxy resins sold by Union Carbide, polyamides such as Zytel resins sold by E.I. duPont, phenol-formaldehyde resins such as Bakelite phenolic resins sold by Union Carbide, acrylics such as Acryloid resins sold by E.I. duPont, urea-formaldehyde resins such as Uformite resins sold by Rohm and Haas Co., and hydroxyethyl cellulose such as Cellosize resins sold by Union Carbide. The amounts of those resins can vary from about 10 percent to about 100 percent by weight based on the weight of the polyurethane resins. Whereas the addition of those resins to the coating composition tends to improve the presslife of a plate, omitting the polyurethane from such compositions substantially reduces presslife. The coating can also be strengthened and its surface appearance and character improved by the addition of reinforcing fillers, for example, synthetic silicas, such as Syloid sold by W.R. Grace Co. To obtain more uniform surface coverage, the addition of anionic surfactants to the compositions can also be beneficial, for example, Alcolec sold by American Lecithin Co. The coatings can be suitably colored by incorporation of a dye and/or a pigment dispersion.

The amount of the polyurethane diazonium coating composition, and thus the thickness of the ultimate image or object area on the article or plate, varies. Too small an amount results in too little material in the object or image area. Hence less than the prolonged durability and presslife otherwise attainable is achieved. Too much of the composition, however, results in thick coatings that are more difficult to develop and into which the penetration of light during exposure either is insufficient or requires an unnecessarily long time, especially considered from a commercial standpoint. Coatings in an amount of from about 25 milligrams to about 500 milligrams per square foot (msf) of base sheet surface strike a satisfactory balance between those parameters. A preferred range is about 100 msf to about 250 msf of the composition.

Coating thickness depends mainly on the concentration of the coating solution and the mechanical means by which it is applied to base sheets. For example, in a continuous process wherein a roll of sheet aluminum is passed through a coating tank, there must be taken into account for each particular system the speed of the web, the tank length, subsequent drying time and temperature, and solvent volatility. The concentration of the coating solution can vary. Presently, from about 1 to about 20 parts of polyurethane and diazonium per 100 parts of solvent can be used, good results being obtainable at concentrations of about 3 to about 10 parts thereof.

A presensitized lithographic plate or other article made as described above is exposed to light through an image transparency and the non-image area is removed by developing the plate. The methods and means of exposing and developing the exposed plate are those well known and commonly used in the lithographic art.

Although the mechanism of the light-promoted reactions in the diazonium components is not clearly understood, it does appear that the reaction(s) cause a sufficient differential between exposed and unexposed areas on the plate so that the developing solution effects removal of the non-image area without affecting the image area. In the case of a negative-acting diazonium, one or more of several reactions might occur in the exposed image area to harden it and render it stable to the developer. For example, the diazonium might react with the polyurethane by a free-radical or some other mechanism, perhaps to form cross-links, or might react with itself. While similar reactions might occur in the positive-acting diazonium components, it seems more likely that the light-promoted reaction renders them susceptible to the developing solution.

An important advantage of the plates provided by this invention, however, is that completely or substantially completely aqueous developing media can be used to remove the polyurethane-diazonium coating in the non-image areas. To facilitate development it is possible and usually preferable to include in the water a developing agent, such as a wetting agent, that more readily enables the water to penetrate the polyurethane-diazonium composition of the coating, loosen the coating from the base and thereby remove the coating in the non-image area. Such agents are used advantageously to reduce the time needed to develop the plate and thus to reduce labor costs. Some that have been found to be especially suitable for developing the plates of this invention include trisodium phosphate, Dupanol, e.g., WAQ, which are aqueous solutions of lauryl sodium sulfate sold by duPont, Tergitol, nonionic and anionic polygylcol ethers and sulfated linear alcohols sold by Union Carbide Corporation, and Tween, fatty acid esters of anhydrous sorbitol sold by Atlas Powder Co. Good results can be obtained by using a wetting agent in an amount up to in the order of about 15 percent by weight of water, e.g., up to about 5 percent (30 percent by solution weight) of a commercial wetting agent such as Dupanol WAQ or up to about 10 percent of trisodium phosphate.

It is also possible to use a small amount of an organic solvent in the aqueous developer, particularly to develop plates coated with a composition containing a relatively large proportion of polyurethane to diazonium component. Such solvents aid in removing the coating by softening the resin therein. Generally the development time is short enough and the concentration of organic solvent in the developer is low enough so that nothing untoward happens to the image areas. Up to about 5 percent by weight of organic solvent, and in some instances up to about 10 percent, can be used advantageously to obtain enhanced efficiency of development. Typical organic solvents include lower alcohols such as isopropanol and cyclohexanol, esters such as butyl acetate, ethers such as methyl Cellosolve, ketones such as cyclohexanone and acetone, and Dowanol, P-Mix, a polypropylene glycol ether sold by Dow Chemical. Cyclohexanone is a preferred solvent.

The following examples illustrate particular embodiments of coating compositions within the scope of the invention, but are not intended to limit it, so that persons skilled in the art will be better able to understand this invention.

EXAMPLE I

A solution of 200 parts by weight of Estane 5715 polyurethane resin in a mixture of 2,800 parts by volume of methyl Cellosolve acetate and 1,200 parts by volume of methyl isobutyl ketone was prepared in a large vessel by shaking the mixture over a period of about 4 days. Another solution was prepared by dissolving 400 parts by weight of an ester of naphthoquinone-(1,2)-diazide-5-sulfonyl chloride with pyrogallol-acetone resin in a mixture of 2,800 parts by volume of methyl Cellosolve acetate and 1,200 parts by volume of methyl isobutyl ketone and stirring for 2 hours in another large vessel. The preparation of light-sensitive solution of the diazo resin was carried out under a yellow light. This was also true of the subsequent operations involving the mixing and coating of the light-sensitive resin mixture on an aluminum web and handling and packing of the presensitized lithographic sheets thus prepared.

The polyurethane and diazo resin solutions were mixed. A dye, 5-(p-diethylamino-benzylidene rhodanine), 20 parts by weight, was added to the mixture. After further stirring, the mixture was filtered several times to remove solids remaining in the solution. The coating mixture was transferred to the container of a dip-coater. Rolled aluminum web with a cleaned and chemically treated surface on one side to provide a suitable surface for the coating was mounted on the coater. The coating was performed with variable coating speeds to obtain various coating weights, generally between about 150 and about 200 mg./sg. ft. The web was dried at slightly elevated temperatures and then cut into standard plate sizes and stored. The plates were stable during months of storage.

The plates were exposed through a positive image transparency in a standard exposure device of the trade. Exposure time varied somewhat due to different coating thicknesses. The exposed areas turned bright orange to form a readily visible image of high contrast. The plates were developed with an alkaline aqueous developer that contained about 2 percent of well-dispersed cyclohexanone. Using a cotton swab, the exposed areas were gently and easily removed from the plate, leaving a clear sharp image in the unexposed portion. The plates were mounted on a lithographic press for printing during which no damage to the image on the plate was observed after 25,000 impressions.

EXAMPLE II

Two solutions were prepared as described in Example I. One contained 10 parts by weight of the same polyurethane dissolved in 140 parts by weight of methyl Cellosolve acetate and 60 parts by weight of methyl isobutyl ketone. The other solution contained 10 parts by weight of the same positive-acting diazo ester resin as used in Example I dissolved in 140 parts by weight of methyl Cellosolve acetate and 60 parts by weight of methyl isobutyl ketone. The two solutions were mixed and 0.5 parts by weight of 5-(p-diethylamino-benzylidene rhodanine) dye was added. The mixture was filtered. A portion of the coating mixture was poured onto cleaned aluminum sheets, the top surfaces of which were grained and chemically treated, whirling on a whirl-coater. The plates were dried at a slightly elevated temperature on the whirl-coater.

Some plates were stored and have good shelf life. One plate was exposed and developed as described in Example I, and had a useful life of over 40,000 impressions.

EXAMPLE III

The procedure of Example II was followed to prepare a lithographic plate with a coating containing a mixture of ingredients in the following solutions:

| | | |
|---|---|---|
| 1. | Polyurethane (Estane 5701) | 5 parts by weight |
| | Methyl ethyl ketone | 100 parts by weight |
| 2. | Diazo ester resin of Example I | 10 parts by weight |
| | Methyl ethyl ketone | 200 parts by volume |
| | Cibacron Brilliant Blue F-C4GP (Ciba Chemical & Dye Co) | 0.3 part by weight |
| | 5-(p-diethylamino-benzylidene rhodanine) | 0.1 part by weight |

The plate was satisfactorily exposed and developed as described in Example I.

EXAMPLE IV

The procedure of Example III was repeated except that Estane 5710 polyurethane was used. Again, the plate was satisfactorily exposed and developed.

EXAMPLE V

The procedure of Example III was repeated except that Estane 5702 polyurethane was used. The plate was satisfactorily exposed and developed.

EXAMPLE VI

To a solution of 100 parts by weight of Estane 5715 polyurethane in 2,000 parts by weight of methyl Cellosolve prepared according to Example I was added a solution containing 200 parts by weight of the ester of naphthoquinone-(1,2)-diazide-5-sulfonyl chloride with pyrogallol-acetone resin, 100 parts by weight of phenol-formaldehyde resin (Bakelite 2620, Union Carbide), 6 parts by weight of Calco Oil Blue due (American Cyanamide Co.) and 8,000 parts by volume of methyl Cellosolve. After filtration, the coating solution was applied on a cleaned, anodized and chemically treated surface of rolled aluminum web by means of a dip-coater as described in Example I. A plate was processed and prepared for press-testing and showed no wear up to 90,000 impressions.

EXAMPLE VII

The procedure of Example II was followed to prepare a lithographic plate with a coating containing a mixture of three solutions:

| | | |
|---|---|---|
| 1. | Polyurethane (Estane 5715) | 4 parts by weight |
| | Methyl Cellosolve | 100 parts by weight |
| 2. | Diazo ester resin of Example I | 5 parts by weight |
| | Methyl Cellosolve | 100 parts by weight |
| 3. | Phenoxy resin (Bakelite Phenoxy PKHH, Union carbide) | 1 part by weight |
| | 5-(p-diethylamino-benzylidene rhodanine) | 0.2 part by weight |
| | Methyl Cellosolve | 25 parts by weight |

The plate was satisfactorily exposed and developed as described in Example I.

EXAMPLE VIII

The procedure of Example II was used to prepare a lithographic plate, the coating mixture for which was combined from the three following solutions:

| | | |
|---|---|---|
| 1. | Polyurethane (Estane 5715) | 5 parts by weight |
| | Methyl Cellosolve | 100 parts by weight |
| 2. | Diazo resin used in Example I | 10 parts by weight |
| | Methyl Cellosolve | 300 parts by weight |
| | 5-(p-diethylamino-benzylidene rhodanine | 0.1 part by weight |
| | Cibacron Brilliant Blue F–C4GP | 0.25 part by weight |
| 3. | Polyethylene oxide (Polyox WSR–N3000, Union Carbide) | 5 parts by weight |
| | Isopropyl alcohol (90% in Water) | 100 parts by weight |

The plate having a coating weight of 190 mg./sq. ft., was exposed and developed as described in Example I, and showed no wear after printing 120,000 impressions.

EXAMPLE IX

The procedure of Example II was employed to prepare a lithographic plate, the coating mixture for which contained a combination of three solutions:

| | | |
|---|---|---|
| 1. | Polyurethane (Estane 5715) | 4 parts by weight |
| | Methyl Cellosolve | 80 parts by weight |
| 2. | Diazo resin used in Example I | 10 parts by weight |
| | Methyl Cellosolve | 200 parts by weight |
| | 5-(p-diethylamino-benzylidene rhodanine) | 0.25 part by weight |
| | Cibacron Brilliant Blue F–C4GP | 0.1 part by weight |
| 3. | Polyamide resin (Zytel 63, duPont) | 3 parts by weight |
| | Methyl alcohol | 100 parts by weight |

The plate was exposed, developed with an alkaline developer without the addition of a solvent, and showed no wear up to about 80,000 impressions.

EXAMPLE X

A lithographic plate was prepared according to Example II, the coating mixture for which contained the following ingredients:

| | | |
|---|---|---|
| 1. | Polyurethane (Estane 5715) | 10 parts by weight |
| | Methyl Cellosolve | 200 parts by weight |
| 2. | Diazo resin used in Example I | 20 parts by weight |
| | Silica (Syloid 244, W.R. Grace Co.) | 4 parts by weight |
| | 5-(p-dimethylamino-benzylidene rhodanine) | 0.5 part by weight |
| | Methyl Cellosolve | 400 parts by weight |

The plate was satisfactorily exposed and developed as described in Example I.

EXAMPLE XI

The procedure of Example VII was repeated except that the diazo used was naphthoquinone-(1,2)-diazide-5-sulfonate ethyl ester. The plate was satisfactorily exposed and developed.

EXAMPLE XII

The procedure of Example II was repeated except that the diazo resin used was an ester of naphthoquinone-(1,2)-diazide-5-sulfonyl chloride with phenol-formaldehyde Bakelite 5833, Union Carbide). The plate was satisfactorily exposed and developed as described in Example I.

EXAMPLE XIII

A lithographic plate was prepared in the same manner as in Example II using the same photosensitive coating solution. The grained aluminum plate, however, was first coated with a 5 percent aqueous solution of phosphotungstic acid on a plate whirler. Upon exposure and development with an alkaline developer containing 2 percent of cyclohexanone, a clear and sharp image was obtained.

EXAMPLE XIV

A solution of 4 parts by weight of polyurethane resin (Estane 5715) in 80 parts by volume of methyl Cellosolve was mixed with another solution consisting of 16 parts by weight of a condensation product of p-diazo diphenylamine, formaldehyde and zinc chloride coupled with 2-hydroxy-4-methoxybenzophenone-5-sulfonic acid dissolved in 200 parts by volume of methyl Cellosolve. A dye, Basic Blue 6G (L & R Organic Products Co.), 0.3 part by weight, was added. After repeated filtration to remove undissolved solids, the solution mixture was coated on a grained and chemically treated aluminum surface by means of a whirl-coater. The coating weight was 164 mg./sq. ft. The plate was exposed through a negative image transparency and developed with an aqueous developer solution containing 10 percent of 2-hydroxy-4-methoxybenzophenone-5-sulfonic acid and 2 percent of cyclohexanone. The unexposed portion was gently removed using a cotton swab to develop a fine, light-hardened image.

EXAMPLE XV

The procedure of Example XIV was employed to prepare a lithographic plate the coating mixture of which contained 2.5 parts by weight each of the polyurethane and the negative-acting diazo resin used in Example XIV dissolved separately in 100 parts by volume each of methyl Cellosolve, and 0.2 part of a dye, Basic Blue. The plate was satisfactorily exposed and developed as described in Example XIV, and a fine image was obtained.

EXAMPLE XVI

A coating mixture was prepared by dissolving separately and then mixing solutions of 300 parts by weight of the polyurethane and 60 parts by weight of the diazo resin used in Example XIV in 6,000 and 2,000 parts by volume of methyl Cellosolve, respectively. A dye, Perfect Blue, 10 parts by weight, was added. The coating was applied on an aluminum web according to the procedure of Example I. A plate cut from the web was exposed through a negative image transparency and satisfactorily developed as described in Example XIV.

EXAMPLE XVII

A lithographic plate was prepared according to the procedure of Example XVI, the coating mixture consisting of 260 parts by weight of polyurethane (Estane 5715) dissolved in 5,200 parts by volume of methyl Cellosolve, 26 parts by weight of the diazo resin used in Example XIV dissolved in 500 parts by volume of methyl Cellosolve, and 5 parts by weight of Monarch Blue due. The coating weight was about 120 to 150 mg./sq. ft. A sheet was satisfactorily exposed and developed as described in Example XIV using a developer containing 4 percent of cyclohexanone, and a well-differentiated image was obtained.

EXAMPLE XVIII

The procedure of Example XIV was followed to prepare a lithographic plate utilizing the identical coating mixture except that Estane 5702 polyurethane resin was used. A satisfactory imaged plate was obtained by exposure and development.

EXAMPLE XIX

The procedure of the previous Example was repeated, substituting Estane 5707 polyurethane (4 parts by weight) dissolved in tetrahydrofuran (80 parts by weight). A fine image was obtained on development and exposure.

EXAMPLE XX

A coating mixture was prepared by the combination of the following two solutions:

| | | |
|---|---|---|
| 1. | Polyurethane (Estane 5715) | 5 parts by weight |
| | Methyl Cellosolve | 100 parts by weight |
| 2. | Diazo resin used in Example XIV | 25 parts by weight |
| | Methyl Cellosolve | 300 parts by weight |
| | Azo-bis(isobutyronitrile) | 2 parts by weight |
| | Basic Blue 6G | 0.5 part by weight |

The coating mixture was applied on an aluminum sheet employing the procedure of Example XIV, and the coated plate was satisfactorily exposed and developed in the same way.

EXAMPLE XXI

A lithographic plate was prepared according to the procedure of Example XVI, the coating mixture consisting of 200 parts by weight of polyurethane (Estane 5715) dissolved in 4,000 parts by volume of methyl Cellosolve, 100 parts by weight of diazo resin used in Example XIV dissolved in 2,300 parts by volume of methyl cellosolve, 10 parts by weight of Lucite 2041 (duPont) dissolved in 200 parts by volume of methyl Cellosolve, and 5 parts by weight of a dye, Perfect Blue. A plate was satisfactorily exposed and developed as described in Example XIV.

EXAMPLE XXII

The procedure of Example XIV was employed to prepare a lithographic plate whose coating mixture contained 10 parts by weight each of the polyurethane and the negative acting diazo resin used in Example XIV dissolved separately in 200 parts by volume each of methyl Cellosolve, 1 part by weight of Phenoxy PKHH resin (Union Carbide) dissolved in 100 parts by volume of methyl Cellosolve, and 0.1 part by weight of Basic Blue 6G dye. The plate was exposed and developed as described in Example XIV, and a fine image was obtained.

EXAMPLE XXIII

A coating mixture made up of two solutions was prepared. One solution contained 5 parts by weight of polyurethane (Estane 5715) dissolved in 100 parts by volume of methyl cellosolve; the other consisted of 15 parts by weight of the diazo resin used in Example XIV, 5 parts by weight of an epoxy resin (Epon 1031, Shell Chemical Co), 0.1 g. of Basic Blue 6G dye and 250 parts by volume of methyl Cellosolve. After filtration, the mixture was coated on an anodized aluminum sheet whirling on a coater. After drying, the plate was satisfactorily exposed and developed with an aqueous developer solution containing 10 percent of 2-hydroxy-4-methoxybenzophenone-5-sulfonic acid.

EXAMPLE XXIV

A lithographic plate was prepared according to the procedure of Example XXIII, the coating mixture being a combination of the following solutions:

| | | |
|---|---|---|
| 1. | Polyurethane (Estane 5715) | 2.5 parts by weight |
| | Methyl Cellosolve | 50 parts by volume |
| 2. | Diazo resin used in | |

| | |
|---|---|
| Example XIV | 10 parts by weight |
| Methyl Cellosolve | 300 parts by volume |
| Basic Blue 6G | 0.5 part by weight |
| 3. Polyethylene oxide (Polyox WSR-N 3000, Union Carbide) | 2.5 parts by weight |
| Methylene chloride | 50 parts by volume |

The coating weight was about 140 mg./sq. ft. A fine, hardened image on the plate was obtained by exposing through a negative image transparency and developing with a solventless aqueous developer containing 10 percent of 2-hydroxy-4-methoxy-benzophenone-5-sulphonic acid.

EXAMPLE XXV

The procedure of Example XXIII was employed to prepare a lithographic plate utilizing a coating mixture of the following solutions:

| | |
|---|---|
| 1. Polyurethane (Estane 5715) | 3.0 parts by weight |
| Methyl Cellosolve | 60 parts by volume |
| 2. Diazo resin used in Example XIV | 15 parts by weight |
| Methyl Cellosolve | 250 parts by volume |
| Basic Blue 6G | 0.5 part by weight |
| 3. Polyamide (Zytel 63, duPont) | 2.0 parts by weight |
| Methyl alcohol | 40 parts by volume |

The plate was satisfactorily exposed and developed with an aqueous developer containing 10 percent of 2-hydroxy-4-methoxy-4-benzophenone-5-sulfonic acid.

EXAMPLE XXVI

The procedure of Example XXIII was followed to prepare a lithographic plate having a coating mixture consisting of the following ingredients:

| | |
|---|---|
| 1. Polyurethane (Estane 5715) | 10 parts by weight |
| Methyl Cellosolve | 200 parts by volume |
| 2. Diazo resin used in Example XIV | 15 parts by weight |
| Methyl Cellosolve | 200 parts by volume |
| Basic Blue 6G | 0.5 part by weight |
| 3. Cellulose Acetate (duPont) | 2 parts by weight |
| Methyl Cellosolve | 40 parts by volume |

The plate was satisfactorily exposed and developed as in previous example.

EXAMPLE XXVII

A lithographic plate was prepared according to the procedure of Example XXIII, the coating mixture consisting of the following solutions:

| | |
|---|---|
| 1. 'Polyurethane (Estane 5715) | 10 parts by weight |
| Methyl Cellosolve | 200 parts by volume |
| 2. Diazo resin used in Example XIV | 15 parts by weight |
| Methyl Cellosolve | 200 parts by volume |
| Basic Blue 6G | 0.5 part by weight |
| 3. Urea-Formaldehyde (Uformite, Rohm & Haas) | 2.5 parts by weight |
| Methyl Cellosolve | 50 parts by volume |

The plate was satisfactorily exposed and developed as in Example XXV.

EXAMPLE XXVIII

A lithographic plate was prepared according to the procedure of Example XXIII, the coating mixture consisting of the following solutions:

| | |
|---|---|
| 1. Polyurethane (Estane 5715) | 3 parts by weight |
| Methyl Cellosolve | 60 parts by volume |
| 2. Diazo resin used in Example XIV | 15 parts by weight |
| Methyl Cellosolve | 200 parts by volume |
| Basic Blue 6G | 0.5 part by weight |
| 3. Phenol-formaldehyde (Bakelite 2620, Union Carbide) | 3 parts by weight |
| Epoxy (Epon 1030, Shell Chemical) | 3 parts by weight |
| Methyl Cellosolve | 100 parts by volume |

The plate was exposed and developed as described in Example XXV, and found to have a satisfactory presslife at least of 45,000 impressions.

EXAMPLE XXIX

The coating mixture used in Example XIV was applied on a copperized aluminum bimetallic plate. The plate was dried, exposed to light through a positive image transparency, and developed with an aqueous developer containing 10 percent of 2-hydroxy-4-methoxy-4-benzophenone-5-sulfonic acid. The copper exposed in the non-image areas was then removed with a copper-etch solution, the coating in the image area was removed with cyclohexanone, and a bimetallic printing plate having a sharp copper image, including lines and half-tones, was obtained.

EXAMPLE XXX

The coating mixture used in Example XIV was applied on a whirling Mylar sheet. The plate was satisfactorily exposed and developed as described in Example XIV.

I claim:

1. A light-sensitive, substantially solvent-soluble, film-forming composition that comprises from about 10 percent to about 95 percent by weight of a synthetic, film-forming, solvent-soluble, water-insoluble, essentially linear polyurethane resin component and a light-sensitive substantially solvent-soluble component that is a negative-acting diazonium compound, said composition being adapted to be coated onto a base sheet from solution in an organic solvent or substantially organic solvent medium, exposed to light in a predetermined area to harden the coating in such area, and removed from unexposed area by an aqueous or substantially aqueous developer.

2. A composition according to claim 1 wherein said polyurethane resin component comprises from about 20 percent to about 60 percent by weight of said composition.

3. A composition according to claim 1 wherein said diazonium compound is a light-hardenable, substantially water-insoluble reaction product of (a) a water-soluble, light-sensitive condensation product of a diazonium compound and an organic condensing agent therefor and (b) a water-insolubilizing organic coupling agent for said condensation product.

4. A composition according to claim 1 wherein said diazonium compound is a diazo-aromatic compound.

5. A composition according to claim 1 wherein said diazonium compound is a diazo-arylamine compound.

6. A composition according to claim 1 wherein said diazonium compound is a p-diazo-diphenylamine compound.

7. A composition according to claim 3 wherein said organic condensing agent for said diazonium compound contains a reactive carbonyl group.

8. A composition according to claim 3 wherein said organic condensing agent for said diazonium compound is an aldehyde or an acetal.

9. A composition according to claim 3 wherein said organic condensing agent for said diazonium compound is formaldehyde zinc chloride or paraformaldehyde.

10. A composition according to claim 3 wherein said organic coupling agent for said condensation product is an acidic aromatic compound, a hydroxyl-containing aromatic compound or an acidic aliphatic compound.

11. A composition according to claim 3 wherein said organic coupling agent for said condensation product is a phosphinic, phosphonic, sulfonic or carboxylic acid of benzene, toluene or naphthalene, an alkali metal salt thereof, a hydroxyl-substituted benzene, naphthalene or anthraquinone, a sulfonic acid or an alkali metal sulfonic acid salt thereof, an aliphatic fatty acid or a polycarboxylic amino-alkane.

12. A composition according to claim 3 wherein said organic coupling agent for said condensation product is toluene sulfonic acid, benzene phosphinic acid, 2,5-dimethyl-benzene sulfonic acid, benzene sulfonic acid sodium salt, nitrobenzene acetic acid, diphenolic acid, 2,3-naphthalene diol, naphthalene-2-sulfonic acid, 1-naphthol-2-sulfonic acid, 1-naphthol-4-sulfonic acid, 2,4-dinitro-1-naphthol-7-sulfonic acid, 2,4-dihydroxy-benzophenone, 2,2'-dihydroxy-4,4'-dimethoxy-benzophenone, 2,2',4,4'-tetra-hydroxy-benzophenone, 2-hydroxy-4-methoxy-benzophenone-5-sulfonic acid, m-(p'-anilino-phenylazo)-benzene sulfonic acid sodium salt, p-morpholino-benzene diazonium fluoborate, alizarin sodium monosulfonate, o-toluidine-m-sulfonic acid, stearic acid or ethylenediamine tetra-acetic acid.

13. A composition according to claim 3 wherein said diazonium compound is p-diazo-diphenylamine, said organic condensing agent for said diazonium compound is formaldehyde zinc chloride or paraformaldehyde, said organic coupling agent for said condensation product is toluene sulfonic acid, benzene phosphinic acid, 2,5-dimethyl-benzene sulfonic acid, benzene sulfonic acid sodium salt, nitrobenzene acetic acid, diphenolic acid, 2,3-naphthalene diol, naphthalene diol, naphthalene-2-sulfonic acid, 1-naphthol-2-sulfonic acid, 1-naphthol-4-sulfonic acid, 2,4-dinitro-1-naphthol-7-sulfonic acid, 2,4-dihydroxy-benzophenone, 2,2'-dihydroxy-4,4'-dimethoxy- benzophenone, 2,2',4,4'-tetra-hydroxy-benzophenone, 2-hydroxy-4-methoxy-benzophenone-5-sulfonic acid, m-(p'-anilino-phenylazo)-benzene sulfonic acid sodium salt, p-morpholino-benzene diazonium fluoborate, alizarin sodium monosulfonate, o-toluidine-m-sulfonic acid, stearic acid or ethylenediamine tetra-acetic acid.

14. A composition according to claim 1 further comprising a curing agent for said polyurethane resin component.

15. A composition according to claim 1 further comprising a resin bonding agent component for said composition.

16. A composition according to claim 15 wherein said bonding agent component is a polyethylene oxide, an aromatic oxide, a polyamide, a phenolformaldehyde, an acrylic, a urea-formaldehyde or a hydroxyethyl cellulose resin.

17. A composition according to claim 16 wherein said composition contains from about 10 percent to about 100 percent by weight of said resin bonding component based on the weight of said polyurethane resin component.

18. An article adapted to be exposed to light and developed to form a lithographic printing plate, a visual aid, a color proof, a printed circuit board or the like which comprises a base sheet and coated thereon a composition that comprises from about 10 percent to about 95 percent by weight of a synthetic, film-forming, solvent-soluble, water-insoluble, essentially linear polyurethane resin component and a light-sensitive substantially solvent-soluble component that is a negative-acting diazonium compound, said composition being adapted to be coated onto a base sheet from solution in an organic solvent or substantially organic solvent medium, exposed to light in a predetermined area to harden the coating in such area, and removed from unexposed area by an aqueous or substantially aqueous developer.

19. A composition according to claim 18 wherein said polyurethane resin component comprises from about 20 percent to about 60 percent by weight of said composition.

20. A composition according to claim 18 wherein said diazinoum compound is a light-hardenable, substantially water-insoluble reaction product of (a) a water-soluble, light-sensitive condensation product of a diazonium compound and an organic condensing agent therefor and (b) a water-insolubilizing organic coupling agent for said condensation product.

21. A composition according to claim 18 wherein said diazonium compound is a diazo-aromatic compound.

22. A composition according to claim 18 wherein said diazonium compound is a diazo-arylamine compound.

23. A composition according to claim 18 wherein said diazonium compound is a p-diazo-diphenylamine compound.

24. A composition according to claim 20 wherein said organic condensing agent for said diazonium compound contains a reactive carbonyl group.

25. A composition according to claim 20 wherein said organic condensing agent for said diazonium compound is an aldehyde or an acetal.

26. A composition according to claim 20 wherein said organic condensing agent for said diazonium compound is formaldehyde zinc chloride or paraformaldehyde.

27. A composition according to claim 20 wherein said organic coupling agent for said condensation product is an acidic aromatic compound, a hydroxyl-containing aromatic compound or an acidic aliphatic compound.

28. A composition according to claim 20 wherein said organic coupling agent for said condensation product is a phosphinic, phosphonic, sulfonic or carboxylic acid of benzene, toluene or naphthalene, an alkali metal salt thereof, a hydroxyl-substituted benzene, naphthalene or anthraquinone, a sulfonic acid or an alkali metal sulfonic acid salt thereof, an aliphatic fatty acid or a poly-carboxylic amino-alkane.

29. A composition according to claim 20 wherein said organic coupling agent for said condensation product is toluene sulfonic acid, benzene phosphinic acid, 2,5-dimethyl-benzene sulfonic acid, benzene sulfonic acid sodium salt, nitrobenzene acetic acid, diphenolic acid, 2,3-naphthalene diol, naphthalene-2-sulfonic acid, 1-naphthol-2-sulfonic acid, 1-naphthol-4-sulfonic acid, 2,4-dinitro-1-naphthol-7-sulfonic acid, 2,4-dihydroxy-benzophenone, 2,'-dihydroxy-4,4'-dimethoxy-benzophenone, 2,2',4,4'-tetra-hydroxy-benzophenone, 2-hydroxy-4-methoxy-benzophenone-5-sulfonic acid, m-(p'-anilino-phenylazo)-benzene sulfonic acid sodium salt, p-morpholino-benzene diazonium fluoborate, alizarin sodium monosulfate, o-toluidine-m-sulfonic acid, stearic acid or ethylenediamine tetra-acetic acid.

30. A composition according to claim 20 wherein said diazonium compound is p-diazo-diphenylamine, said organic condensing agent for said diazonium compound is formaldehyde zinc chloride or paraformaldehyde, said organic coupling agent for said condensation product is toluene sulfonic acid, benzene phosphinic acid, 2,5-dimethyl-benzene sulfonic acid, benzene sulfonic acid sodium salt, nitrobenzene acetic acid, diphenolic acid, 2,3-naphthalene diol, naphthalene-2-sulfonic acid, 1-naphthol-2-sulfonic acid, 1-naphthol-4-sulfonic acid, 2,4-dinitro-1-naphthol-7-sulfonic acid, 2,4-dihydroxy-benzophenone, 2,2'-dihydroxy-4-4'-dimethoxy-benzophenone, 2,2',4,4'-tetra-hydroxy-benzophenone, 2-hydroxy-4-methoxy-benzophenone-5-sulfonic acid, m-(p'-anilino-phenylazo)-benzene diazonium fluoborate, alizarin sodium monosulfonate, o-toluidine-m-sulfonic acid, stearic acid or ethylenediamine tetra-acetic acid.

31. A composition according to claim 18 further comprising a curing agent for said polyurethane resin component.

32. A composition according to claim 18 further comprising a resin bonding agent component for said composition.

33. A composition according to claim 32 wherein said bonding agent component is a polyethylene oxide, an aromatic oxide, a polyamide, a phenolformaldehyde, an acrylic, a urea-formaldehyde or a hydroxyethyl cellulose resin.

34. A composition according to claim 33 wherein said composition contains from about 10 percent to about 100 percent by weight of said resin bonding component based on the weight of said polyurethane resin component.

* * * * *

UNITED STATES PATENT OFFICE
CERTIFICATE OF CORRECTION

Patent No. 3,660,097 Dated May 2, 1972

Inventor(s) Shashi B. Mainthia

It is certified that error appears in the above-identified patent and that said Letters Patent are hereby corrected as shown below:

Col. 3, line 41, after "acting" insert -- ) --; Col. 4, line 13, change "zironcium" to -- zirconium --; Col. 5, line 1, delete "15,5,"; Col. 9, line 15, change "parts" to -- part --, line 22, change "have" to -- had --, line 62, change "Cyanamide" to -- Cyanamid --; Col. 10, line 66, delete "10"; Col. 11, line 5, before "Bakelite" insert -- ( --; Col. 15, line 59, change "diazinoum" to -- diazonium --; Col. 16, line 31, before "2,'" insert -- 2, --.

Signed and sealed this 26th day of September 1972.

(SEAL)
Attest:

EDWARD M.FLETCHER,JR.
Attesting Officer

ROBERT GOTTSCHALK
Commissioner of Patents